United States Patent [19]

Ohta et al.

[11] Patent Number: 5,041,783

[45] Date of Patent: Aug. 20, 1991

[54] PROBE UNIT FOR AN ATOMIC PROBE MICROSCOPE

[75] Inventors: Hiroko Ohta; Tsugiko Takase; Shuzo Mishima; Hirofumi Miyamoto; Takao Okada, all of Hachioji, Japan

[73] Assignee: Olympus Optical Co., Ltd., Tokyo, Japan

[21] Appl. No.: 475,169

[22] Filed: Feb. 5, 1990

[30] Foreign Application Priority Data

Feb. 13, 1989 [JP] Japan ................................. 1-31104

[51] Int. Cl.⁵ .................... G01R 31/00; H01J 37/00
[52] U.S. Cl. .................... 324/158 P; 324/96; 324/158 R; 324/158 D; 250/306
[58] Field of Search ................ 324/96, 158 R, 158 P, 324/158 F, 72.5, 158 D; 439/482; 250/492.1, 442.1

[56] References Cited

U.S. PATENT DOCUMENTS

| | | | |
|---|---|---|---|
| 4,343,993 | 8/1982 | Binning et al. | 250/306 |
| 4,709,141 | 11/1987 | Olsen | 324/158 D |
| 4,851,767 | 7/1989 | Halbout et al. | 324/158 D |
| 4,857,836 | 8/1989 | Söelkner | 324/158 P |
| 4,891,584 | 1/1990 | Kamieniecki et al. | 324/158 D |
| 4,914,293 | 4/1990 | Hayashi et al. | 250/306 |
| 4,928,058 | 5/1990 | Williamson | 324/96 |

Primary Examiner—Kenneth A. Wieder
Assistant Examiner—Vinh P. Nguyen
Attorney, Agent, or Firm—Frishauf, Holtz, Goodman & Woodward

[57] ABSTRACT

A probe unit includes a disk-like substrate made of transparent material, a transparent electrode coated on all over the substrate, and a metal wire whose sharp tip is projected vertically and upwardly from the center of the substrate through the transparent electrode. The metal wire is made of Pt-Ir, which incudes a sharp tip projected from the upper surface of the substrate and a stem embedded in a hole of the electrode and fixed to the electrode and substrate by conductive adhesive.

17 Claims, 7 Drawing Sheets

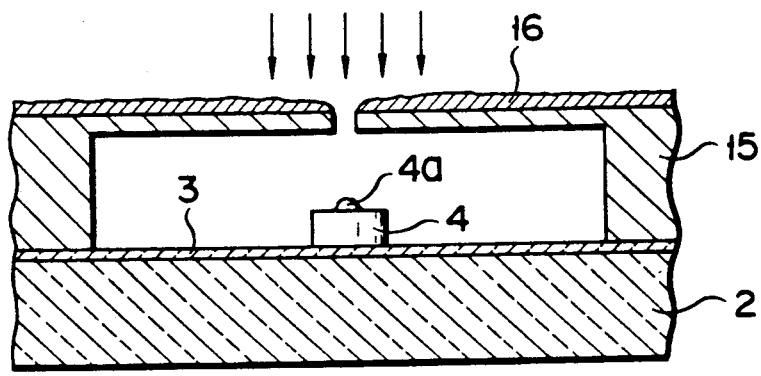
F I G. 2D
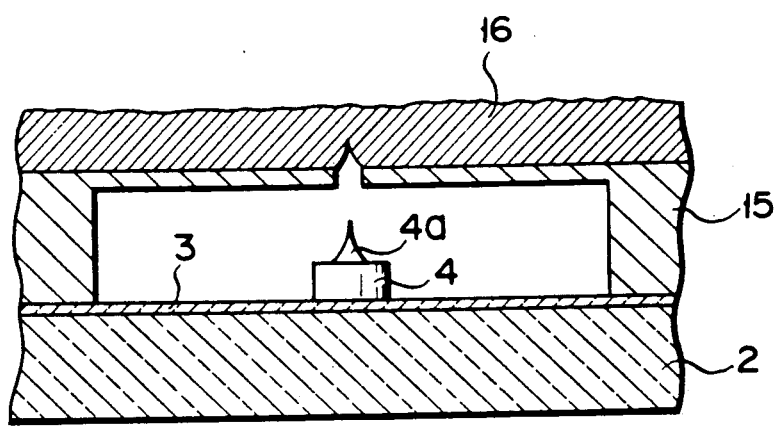
F I G. 2E

| ELECTRODE | VOLTAGE | MOVING DIRECTION | VOLTAGE | MOVING DIRECTION |
|---|---|---|---|---|
| X | + | +x | − | −x |
| Y | + | +y | − | −y |
| $\overline{X}$ | − | +x | + | −x |
| $\overline{Y}$ | − | +y | + | −y |
| Z | + | +z | − | −z |

PROBE UNIT FOR AN ATOMIC PROBE MICROSCOPE

BACKGROUND OF THE INVENTION

1. Field of the Invention

The present invention relates to a probe unit suitable for use with a scanning tunnel microscope (which will be hereinafter referred to as STM) intended to analyze the surface structure of a sample using the tunnel phenomenon of electrons.

2. Description of the Related Art

STM's provide extremely high resolution, and are capable of measuring concave and convex surface of a sample down to the level of atoms. STM's are also capable of measuring the state of electrons on the sample surface to be viewed. Such STM's have been developed as a device for observing surfaces of various samples. One of them is disclosed in U.S. Pat. No. 4,343,993. According to this STM, bias voltage is applied between the sample and the probe to generate tunnel current under such a condition that the conductive probe is moved toward the sample surface to be viewed with a distance of several nm or less interposed between them. Tunnel current detected by the probe which scans the sample surface is imaged to analyze the sample surface to be viewed.

The reason why this STM can have a resolution good enough to analyze the sample surface down to the level of atoms and to measure the state of electrons on the sample surface is that the tunnel phenomenon of electrons is used. The tunnel phenomenon of electrons means that when bias voltage is applied to two conductive matters materials (such as the metal probe and the conductive sample) under such a condition that they approach each other to a distance of several 10 Å or less interposed between them, current (which is called tunnel current) flows between them. Usually, electrons are bound in a solid by binding energy which is called work function, and they cannot be forced outside the solid unless energy larger than this binding energy is added to them. However, an electron cloud envelopes the surface of the solid. When both of the probe and the sample surface are brought toward each other to tunnel region, several nm or less in length, their respective electron clouds overlap each other to thereby make their electrons freely movable. When bias voltage is applied to them under this state, tunnel current flows between them.

Tunnel current I can be expressed as follows:

$$I \propto \exp(-k \cdot \phi \cdot d)$$

wherein K represents a constant, $\phi$ an average of work functions of both of the probe and the sample, and d a distance (or tunnel region) between the probe and the sample.

As expressed by this formula, tunnel current I depends largely on distance (d) and the value of tunnel current is changed by a unit or more because of an atom which forms a concave or convex on the sample surface to be viewed. When tunnel effect is used, therefore, resolution relative to the sample surface can be significantly raised in the vertical direction of the sample surface.

The STM which uses tunnel effect can have the following advantages in addition to extremely high resolution.

1) Measurement relative to the sample surface can be conducted in atmospheric pressure (or air), gas, liquid, vacuum and at low temperature.

2) Atoms of the sample can be viewed not in reciprocal lattice space but in physical space.

3) Measurement can be conducted without contacting and damaging the sample.

4) The sample can be measured as it is without applying any specific process to the sample.

5) The surface physical property of the sample can be measured.

STMs are being applied to various fields, using these advantages.

The behavior of the STM will be described below.

The STM includes an actuator for adjusting the distance between the probe and the sample in direction Z (or direction of axis Z) and another actuator for adjusting the sample in directions (or directions of X and Y on plane) perpendicular to direction Z. The probe having a sharp tip is brought near the sample surface by the Z-direction actuator to such an extent that electron clouds respectively enveloping both of them slightly overlap each other. Voltage (or tunnel voltage) is applied between them to cause tunnel current to flow from the probe to the sample. The sample is moved in directions X and Y by the XY-direction actuator, while servo-operating the Z-direction actuator to hold the tunnel current constant, and the sample surface to be viewed is two-dimensionally scanned by the probe. Servo-voltage applied to the Z-direction actuator which servo-operates the probe is read and imaged to enable the sample surface to be observed. In other words, the probe scans the sample surface in the XY directions while the tunnel current is at a certain value set by the spacing between the probe and the sample surface. When the probe meets a stepped portion on the sample surface, tunnel current increases. In response, the probe is separated from the sample by the Z-direction actuator until tunnel current returns to the certain value. The amount of movement of the probe caused by the Z-direction actuator changes corresponding to concaves and convexes on the sample surface. The servo-voltage is read while repeating the scanning of the probe relative to the sample surface, and from it the image of the sample surface can be obtained.

In the case where the sample surface to be viewed is flat even when viewed on atomic scale, the probe is not particularly adjusted by the Z-direction actuator but tunnel current detected only when the probe two-dimensionally scans the sample surface may be imaged.

In the case where the sample is to be observed through the STM, the sample is first visually viewed by the operator to identify a point necessary to be observed, and this point of the sample surface is then observed in detail through the STM. Therefore, measurement relative to fine points difficult to be visually viewed that is, measurement relative to plural points on a grain of ceramics, comparison measurement relative to plural points on different grains of ceramics and observation relative to LSI patterns, gratings and pits on the compact disk cannot be conducted.

In the case where these fine points on sample surfaces are to be observed through an STM, the optical microscope is combined with the STM. The sample surface is viewed at a large area through the optical microscope to identify some points in this area of the sample surface, and these identified points are then observed in detail through the STM. Observation relative to the fine points on the sample surface can be thus conducted.

This STM observation makes it necessary for the probe unit, which serves as the probe, to be located in front of the objective lens of the optical microscope or between the objective lens and the sample to be viewed. However, the probe unit is optically opaque. This opaque probe unit therefore hinders the field of view of the optical microscope, thereby making it impossible to combine the STM with the optical microscope to observe fine points on the sample surface.

SUMMARY OF THE INVENTION

The object of the present invention is to provide a probe unit capable of carrying out STM observation relative to the surface of a sample through a combination of the optical microscope and the STM without hindering the field of view of the optical microscope.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A through 11 are intended to explain some embodiments of the present invention wherein FIGS. 1A and 1B are sectional and plan views showing an example of the probe unit according to the present invention;

FIGS. 2A through 2E and 3A through 3D show different processes of making the probe unit;

FIGS. 5 through 7 show different applications of the probe unit;

FIGS. 8A through 8C show the arrangement of a three-dimensional actuator, in which FIG. 8A is a plan view, FIG. 8B a side view and FIG. 8C a sectional view;

FIG. 9 is intended to explain how the three-dimensional actuator is driven;

FIGS. 10 and 11 show other different applications of the probe unit; and

DETAILED DESCRIPTION OF THE PREFERRED EMBODIMENTS

Figure 1A:
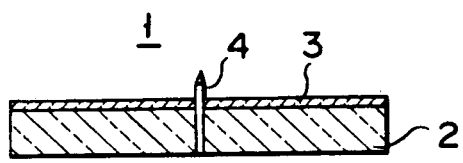
Figure 1B:
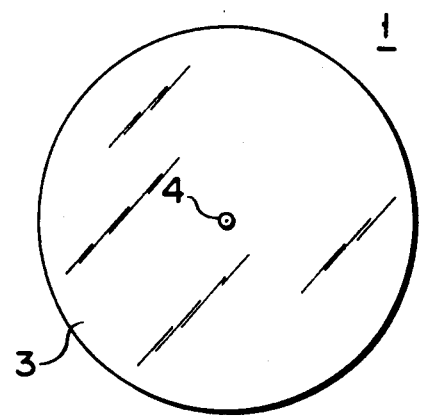

A first embodiment of the probe unit shown in FIGS. 1A and 1B comprises disk-like substrate 2 made of transparent material, transparent electrode 3 which is a transparent conductive layer coated on all over substrate 2, and metal wire 4 whose sharp front tip is projected vertically and upwardly from the center of substrate 2 through transparent electrode 3.

The material of which substrate 2 is made is light sensitive glass PEG 3 (made by HOYA). This light sensitive glass PEG 3 is a silicate made by melting metal ions together with a sensitizer, and when heating and developing process is applied to that portion of light sensitive glass PEG 3 which is exposed by ultraviolet rays, crystal can be developed at this portion of light sensitive glass PEG 3. This crystal is quite fine and easily melts with acid. It is therefore excellent in its being made to have a fine shape and it can be processed one time in a mass scale. Disk-shaped substrate 2 has a diameter of 10 mm and a thickness of 1 mm. A hole having a diameter of $100\mu$ extends along the center axis of disk-like substrate 2. When this hole is to be formed, the upper surface of substrate 2 is masked in such a way that a circular area having a diameter of $100\mu$ appears at the center of substrate 2, and this masked substrate 2 is exposed by ultraviolet rays. The circular area of substrate 2 thus exposed is then heated and developed to grow crystal, which is melted with acid.

Tin oxide is vacuum-deposited on the surface of substrate 2 provided with the hole and transparent electrode 3 is thus formed on substrate 2. The vacuum deposition is applied to substrate 2 which is kept heated to 300° C., using as tin oxide a tablet doped by indium and also using electron beam as the vacuum depositing source. Transparent electrode 3 thus formed has in the center thereof a through-hole coaxially communicated with the hole of substrate 2. Surface-resistance in this electrode 3 was lower than 100 $\Omega\cdot$cm.

Metal wire 4 is made of Pt-Ir (platinum iridium). Other materials such as W (tungsten) and Pt (platinum) may be used. The front tip of metal wire 4 is sharpened by electrolytic polishing. This sharp tip of metal wire 4 is projected about 1 mm from the upper surface of substrate 2 and its stem is embedded in the hole of substrate 2, passing through the through-hole of electrode 3, and fixed to electrode 3 and substrate 2 by adhesive. Conductive adhesive (Cycolon B; Trade Name) is used as the adhesive and when this conductive adhesive is used, metal wire 4 can be electrically connected to transparent electrode 3 and they can be made equipotential.

Probe unit 1 made as described above is located in front of the objective lens of the optical microscope, for example, or between the objective lens and a sample. Probe unit 1 or the sample is moved in direction Z to approach the sharp front of metal wire 4 to the sample. Voltage is applied from outside to metal wire 4 through transparent electrode 3 under this state and tunnel current is thus detected by the sharp tip of metal wire 4. STM observation is conducted relative to the surface of the sample on the basis of tunnel current detected while moving the sample in directions X - Y.

According to this embodiment of the present invention, probe unit 1 is made optically transparent except its metal wire 4 and those portions of substrate 2 and electrode 3 which are bonded to metal wire 4. When STM observation is to be conducted with probe unit 1 located in front of the objective lens or between the objective lens and the sample, therefore, the sharp tip of metal wire 4 may be moved from the focusing position of the optical microscope in the direction of the optical axis thereof. The sharp tip of metal wire 4 can be thus shifted from the focusing position and the sample surface can be observed through probe unit 1 without hindering the field of view of the microscope.

Figure 12:
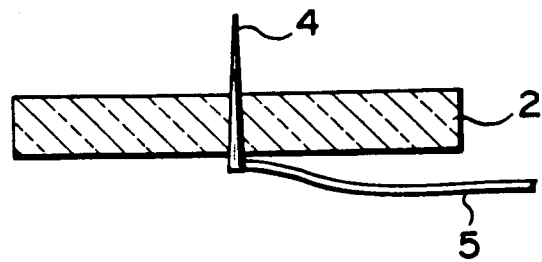
FIGS. 12 to 15 show modifications of the probe unit.
Figure 13:
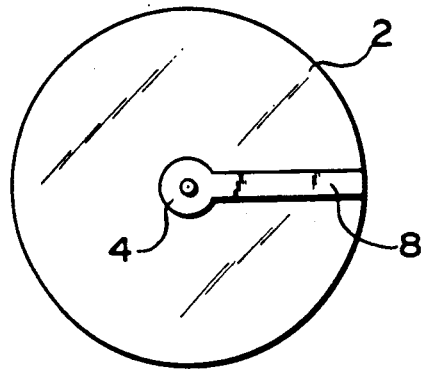

A probe unit shown in FIG. 12 includes metal wire 5 electrically connected to the base of probe 4 for supplying an electric power to the probe 4, instead of a transparent electrode. Though inferior to the above embodiment in that the visual field of the optical microscope is partially prevented, in practical aspects, when a focal point of an optical system is formed at a probe tip, in particular, within the visual field, the proximal end of the probe is largely displaced from the focal point and is not set in the focused state. Thus, the visual field is not prevented even if there is provided a metal wire 5, shown in FIG. 12, led from probe 4 directly to the outside of the flux of light. Alternatively, a lead pattern 8 is shown in FIG. 13, lead pattern 8 is led from probe 4, and is formed by depositing Au on transparent substrate 2 and which becomes optically opaque.

Figure 2A:
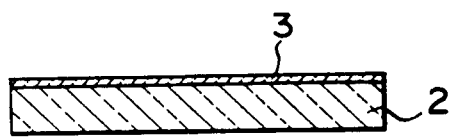
Figure 2B:
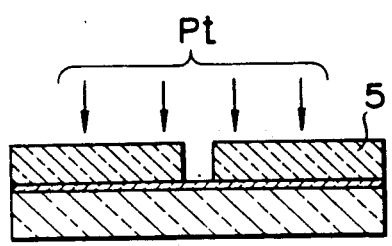
Figure 2C:
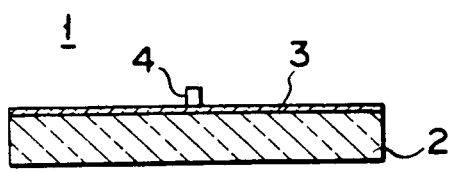
Figure 3D:

Referring to FIGS. 2A through 2C, it will be described how a second embodiment of the probe unit according to the present invention is made. Probe unit 1 comprises transparent substrate 2, transparent electrode 3 formed on substrate 2, and metal projection 4 formed on the center of transparent electrode 3 by vacuum deposition.

Single crystal sapphire is used as transparent substrate 2. It is processed like a disk having a diameter of 10 mm and a thickness of 1 mm. Its upper and lower sides are polished to have a surface roughness of C-face. This substrate 2 will be hereinafter referred to as a sapphire substrate.

As seen in the case of the first probe unit, tin oxide is vacuum-deposited on the surface of sapphire substrate 2 to form transparent electrode thereon. FIG. 2 shows transparent electrode 3 formed on substrate 2. As shown in FIG. 2B, glass plate 5, 5 mm thick, having a hole whose diameter is 50 µm in the center thereof is placed on transparent electrode 5, with its hole aligned with the center of sapphire substrate 2. As the result, the upper surface of transparent electrode 3 is masked by glass plate 5 except its center area.

Sapphire substrate 2 provided with glass plate 5 is attached to a copper plate, which is fixed in the vacuum chamber of the sputtering device (for example, SPF-430H, made by Anerva corporation). Sputtering is then carried out, keeping the degree of vacuum in the chamber higher than $1 \times 10^{-6}$ Torr and using Pt as the target, to thereby form the layer of Pt in the hole of glass plate 5. Sapphire substrate 2 is heated higher than 250° C. at this time to well bond Pt to sapphire.

When sputtering is finished, sapphire substrate 2 is gradually cooled in the vacuum chamber and when the temperature of sapphire substrate 2 is lowered to room temperature, it is picked up out of the vacuum chamber and its mask 5 is removed.

Projection 4 of Pt which serves as the probe which has a diameter of 50 µm and a height of 10 µm can be formed on transparent electrode 3, as shown in FIG. 2C. Sapphire substrate 2 can be tilted in the course of the sputtering process to make the tip of projection 4 sharp.

In order to sharpen the angle of the tip of the projection, subsequent to the step illustrated in FIG. 2C, mask 15 with an opening of about 3µ is arranged such that the opening is located above the projection 4 with a spacer being used, as has been proposed by the Stanford University. Then, as indicated by arrows in the figure, metal such as Pt, Ir or W is sputtered as shown in FIG. 2D.

In this case, since the opening in the mask is sufficiently small, the metal deposited on the mask 15 gradually narrows the opening, and a metal portion deposited on projection 4 is sharpened. When the opening in mask 15 is closed off, a metal probe with a single deposited particle on its tip is formed on the projection 13 as shown in FIG. 2E.

This process may be carried out in the process illustrated in FIG. 2B.

When probe unit 1 thus made is used, STM observation can be conducted even in a combination of STM and the optical microscope without hindering the field of view of the optical microscope.

Figure 3A:
Figure 3B:
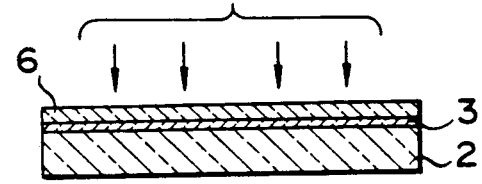
Figure 3C:
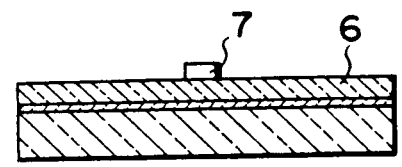

Referring to FIGS. 3A through 3D, it will be described how a third embodiment of the probe unit according to the present invention is made. One of the substrates employed in the above-described embodiment is used. Tin oxide is vacuum-deposited on the surface of substrate 2 to form transparent electrode 3 thereon. FIG. 3A shows transparent electrode 3 formed on substrate 2. As shown in FIG. 3B, Au is vacuum-deposited on transparent electrode 3 to form Au film 6, 5 µm or less thick, thereon. The center area of Au film 6 is masked by circular photoresist 7, whose diameter is 10 µm, and then etched by aqua regia, as shown in FIG. 3C. The mask is thus removed and conical Au projection 4 having a diameter of 10 µm and a height of 5 µm is formed on transparent electrode 3 to serve as probe for probe unit 1.

Projections 4 of second and third probe units 1 are extremely shorter, as compared with the one of first probe unit 1, when measured from their foremost ends to the surface of substrate 2. If the sample surface has concaves and convexes whose depth and height are larger than the height of projection 4 and substrate 2 is not arranged parallel to the sample surface when probe unit 1 is to be approached the sample surface, therefore, tunnel current may not be detected by projection 4 of probe unit 1. This makes it necessary to variously design the form of substrate 2.

Figure 4A:
FIGS. 4A through 4D show different transparent substrates.
Figure 4C:
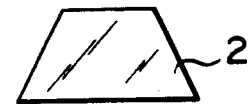
Figure 4B:
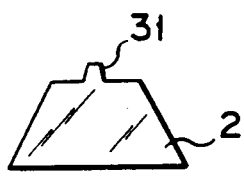
Figure 4D:

Substrates 2 shown in FIGS. 4A through 4D are so designed to meet the above-mentioned need. In the case of substrates 2 shown in FIGS. 4A and 4B, protrusion 31 on which the probe or projection (not shown) is mounted is formed on the center of substrate 2 so as to make longer the distance extending from the surface of substrate 2 to the foremost end of the projection. For the purpose of preventing protrusion 31 from hindering the field of view of the optical microscope, its diameter is preferably smaller than 200 µm when the field of view of the optical microscope is 400 times, for example. The substrate shown in FIG. 4C has a form smallest to allow the flux of light collected by the objective lens of the optical microscope to penetrate therethrough. When the magnification of the objective lens is 40 times, for example, the top of the substrate is set to have a diameter of about 2 mm. When arranged in this manner, the front of the projection can detect tunnel current, providing that depth and height of concaves and convexes present on the sample surface at an areas of about 2 mm are smaller than the height of the projection projected from the substrate. The surface of the substrate shown in FIG. 4D is made spherical. It may be arranged that a spherical lens is used as this substrate and that the transparent electrode and the projection are formed on the lens.

It will be described how a probe unit is made using the substrate shown in FIG. 4A. Single crystal sapphire is processed as the substrate in a disk having a diameter of 10 mm and the substrate surface is treated to expose its crystal axis so as to form a C-face. A protrusion is formed on the center of the substrate, using Saita's lens processing machine (made by Saita machineries Corporation). The protrusion is shaped like a conical trapezoid, 500 μm high, and it has a diameter of 80 μm at the top and a diameter of 150 μm at the base. The substrate surface except the protrusion is polished to have a surface roughness of about λ. A transparent electrode is vacuum-deposited on the substrate surface including the protrusion. When the transparent electrode is formed on the substrate surface, the substrate surface except the center area of the top of the protrusion is masked by photoresist and the center area on the top of the protrusion is coated with Pt according to the sputtering process. The sputtering is carried out under the same conditions as those in the second embodiment but the substrate is not heated because the photoresist is frail to heat. After the substrate is picked up out of the vacuum chamber, the photoresist is removed from it. The probe unit provided with a projection projected from the center of the top of the protrusion is thus made.

It is preferable that the material of which the substrate of the probe unit is made is changed depending upon what measuring wavelength range the optical microscope has. In the case of the common optical microscopes, materials having high transmittance at visible radiation range such as glass (soda lime glass, borosilicated glass, silica glass, quartz glass and light sensitive glass, for example), acryl (epoxy denatured acryl, styrene denatured acryl and high polymer acryl, for example), single crystal sapphire and polycarbonate are preferable for the substrate. In the case of using light having such wavelengths as belong to ultraviolet rays range as seen in the fluorescence microscopes, alumino silica glass, quartz glass and single crystal sapphire which allow ultraviolet rays to pass therethrough are suitable for the substrate.

In the case where light having such wavelengths as belong to infra-red rays range is used as seen in the infrared microscopes, KBr and rock salt having high transmittance at infrared rays range are preferable. In the case of near-infrared rays range (whose wavelengths range about 1-3 μm), silica glass and single crystal glass are preferable.

In the case of X-ray microscopes, it is preferable to use belyrium as the substrate.

Figure 5:
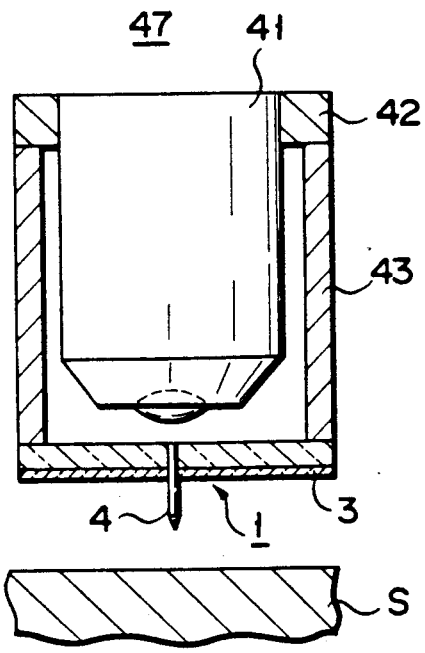

FIG. 5 shows the probe unit for STM observation arranged relative to the objective lens of the optical microscope. Reference numeral 41 represents an objective lens body of the optical microscope and ring-shaped support member 42 is detachably and concentrically arranged relative to the outer circumference of objective lens body 41. Screwing and bolting are used as a means for attaching support member 42 to objective lens body 41. The base of cylindrical three-dimensional actuator 43 which encloses the outer circumference of the front end portion of objective lens body 41 is fixed or detachably attached to support member 42. Probe unit 1 is attached to the front end of three-dimensional actuator 43 with high accuracy. Probe unit 1 includes transparent substrate 2, transparent electrode 3 and conductive projection 4 which serves as probe, and one of the above-described first to third embodiments is used as probe unit 1. Probe unit 1 is combined with three-dimensional actuator 43 to form tunnel scanning unit 47 which is adjusted to move relative to the observed surface of sample S in the vertical and horizontal directions (or directions Z and X - Y).

In the case of STM provided with this scanning unit 47, that surface area of sample S which is to be STM-scanned is observed through the optical microscope with transparent substrate 2 interposed between objective lens body 41 and sample S, under such a condition that the center axis of projection 4 of probe unit 1 is aligned with the optical axis of objective lens 41. Projection 4 is approached the surface area of sample S to be observed while observing this surface area, which is also to be STM-scanned, through the optical microscope. Projection 4 of probe unit 1 is then three-dimensionally moved by three-dimensional actuator 43 to STM-observe the surface area of sample S.

According to this embodiment, probe unit 1 but for projection 4 is made of transparent material. Even when it is arranged in front of objective lens 41, therefore, probe unit 1 does not hinder the field of view of the optical microscope. This enables sample S to be viewed through objective lens 41 with probe unit 1 interposed between them, so that observation and measurement can be achieved overlapping STM-observed image over image viewed through the optical microscope.

Figure 14:
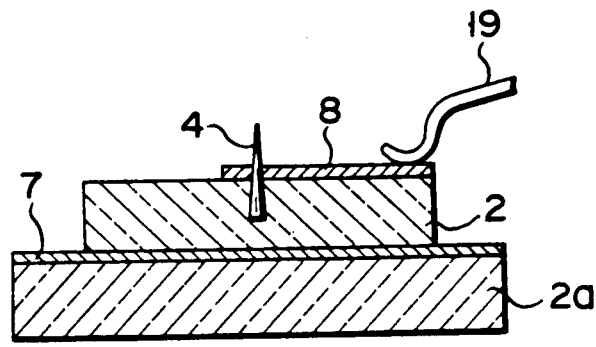

The unit according to this embodiment, shown in FIG. 5, comprising transparent substrate 2, transparent electrode 3 and projection 4, may be replaced with a unit according to another embodiment, shown in FIG. 14, comprising first transparent substrate 2, over which lead pattern 8 and implanted metal probe 4 are electrically connected, and second transparent substrate 2a having transparent electrode 7. First transparent substrate 2 and second transparent substrate 2a are placed on each other with the transparent electrode 7 interposed therebetween.

In this case, a tunnel current is taken from a plate spring 19 contacted with pattern 8. Transparent electrode 7 is grounded through a line (not shown) thereby separating a tunnel current detection system, and a piezoelectric actuator drive system. Thus, a leak current can be prevented. Though lead pattern 8 is constructed by a transparent electrode, it can be replaced with an opaque electrode as far as the optical system is not adversely affected.

Figure 6:
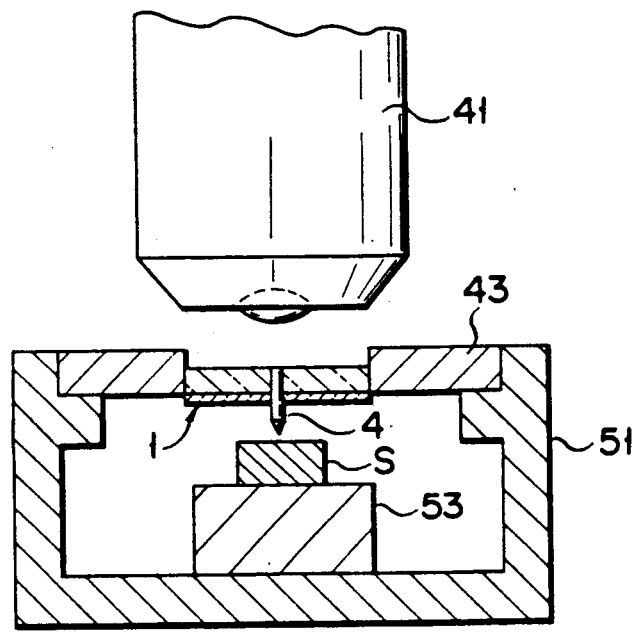

Another application of probe unit 1 will be described referring to FIG. 6. Probe unit 1 is located relative to frame-like support member 51, which is opposed to objective lens 41 and which houses sample S therein, through three-dimensional actuator 51. Frame-like support member 51 has a circular opening at the top thereof and ring-shaped three-dimensional actuator 43 is fitted, concentric with the optical axis of objective lens 41, into the circular opening of support member 51. Actuator 43 also has a circular opening in the center thereof, into which probe unit 1 is attached to close the opening. Projection 4 of probe unit 1 is projected toward sample S mounted on sample table 53 with its center aligned with the optical axis of objective lens 41.

According to this embodiment, sample S can be viewed through the optical microscope with probe unit 1 interposed between them and when the three-dimensional scanning of probe unit 1 is carried out through actuator 43, the surface of sample S can be STM-observed.

Figure 7:
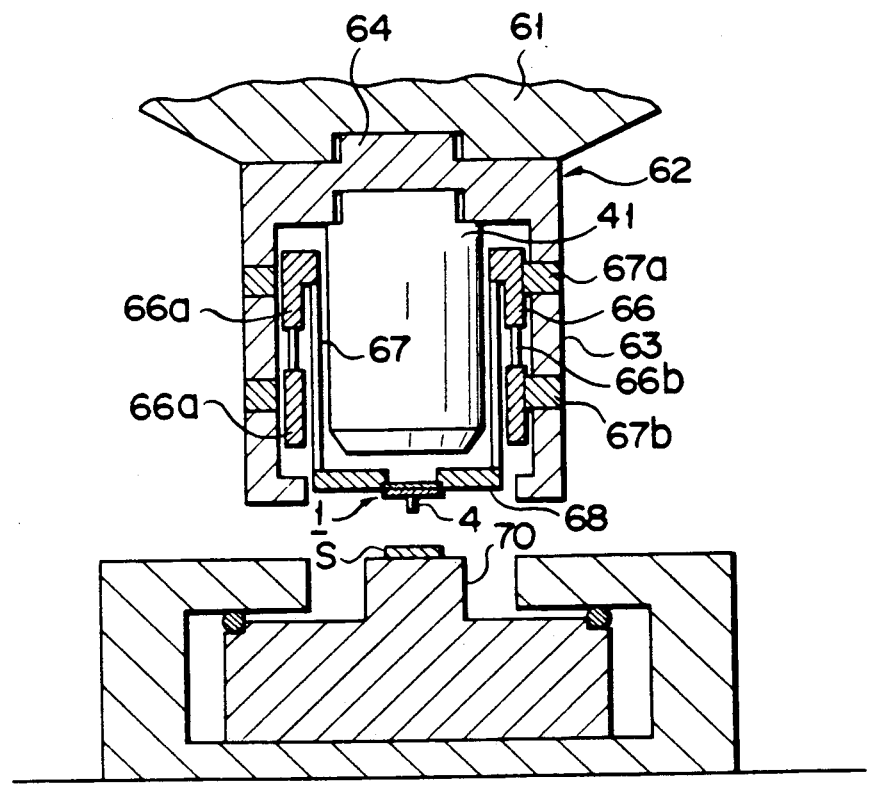

A further application of probe unit 1 will be described with reference to FIG. 7. Reference numeral 61 represents a revolver of the optical microscope and objective lens unit 62 is detachably attached to this revolver 61. Objective lens unit 62 includes cylindrical outer frame 63 which has an opening at the lower end face thereof. Protrusion 64 round which a male screw thread is formed to screw into a female screw thread of revolver 61 is projected from the top of outer frame 63. Outer frame 63 houses objective lens 41, which is screwed, at its upper end, into a threaded hole in the center of the underside of outer frame 63. Cylindrical inner frame 66 is located between the outer circumference of objective lens 41 and the inner circumference of outer frame 63. Inner frame 66 comprises a pair of supports 66a separated from each other in the vertical direction with a certain interval interposed between them, and cylindrical fine adjustment 66b supported between supports 66a and consisting of a piezoelement shrinkable in the vertical direction. Supports 66a are selectively fixed by a pair of upper and lower fine adjustments 67a and 67b which are located in the circumferential wall of outer frame 63 and separated from each other in the vertical direction. These paired fine adjustments 67a and 67b are shifted from each other by 180 degrees and comprise piezoelements shrinkable toward inner frame 66. The upper end of cylindrical three-dimensional actuator 67 located, eccentric with objective lens 41, between inner frame 66 and objective lens 41 is fixed to upper support 66a. Actuator 67 drives upper and lower fine adjustments 67a and 67b alternately to release upper and lower supports 66a alternately. Upper and lower supports 66a are moved in direction Z by the so-called inch worm system of intermittently shrinking fine adjustment 66b responsive to the alternate releasing of supports 66a. Circular metal frame 68 provided with a circular opening in the center thereof is fixed, at the outer circumference thereof, to the lower end of actuator 67. It is preferable that metal frame 68 is detachably fixed to actuator 67 by means of screws, for example. Probe unit 1 is attached to the circular opening of metal frame 68 to close the opening. One of the above-described first to third embodiments is used as probe unit 1. Probe unit 1 is fixed to metal frame 68, directing its projection 4 toward sample S. Sample S is mounted on sample table 70 movable in directions X - Y. Sample table 70 may be a combination of an actuator moved in direction X and another actuator moved in direction Y. Alternately it may be a cylindrical three-dimensional actuator located under sample S.

Objective lens 41 is attached to revolver 61 of the optical microscope to observe the surface of sample S. The focusing of the optical microscope is achieved this time by moving XY stage 70. After objective lens unit 62 is set at the focusing position of the optical microscope, probe unit 1 is finely adjusted by fine adjustment 67a to detect tunnel current by its projection 4. Three-dimensional actuator 68 is then driven to scan the surface of sample S by projection 4 of probe unit 1. The optical microscope is positioned and the surface of sample S is STM-viewed in this manner.

The cylindrical three-dimensional actuator used in the above embodiment will be concretely described referring to FIGS. 8A through 8C and 9. Reference numeral 71 represents an actuator body which is made cylindrical. X electrode 72, −Y electrode 73, −X electrode 74 and Y electrode 75 are arranged round the lower end portion of actuator body 71 with a certain interval interposed between them in the circumferential direction of body 71. X electrode 72 is shifted from −X electrode 74 by 180 degrees while Y electrode 73 is also shifted from −Y electrode 75 by 180 degrees. Z electrode 76 is arranged all round the upper portion of actuator body 71.

Figures 8A, 8B, 8C, 9:
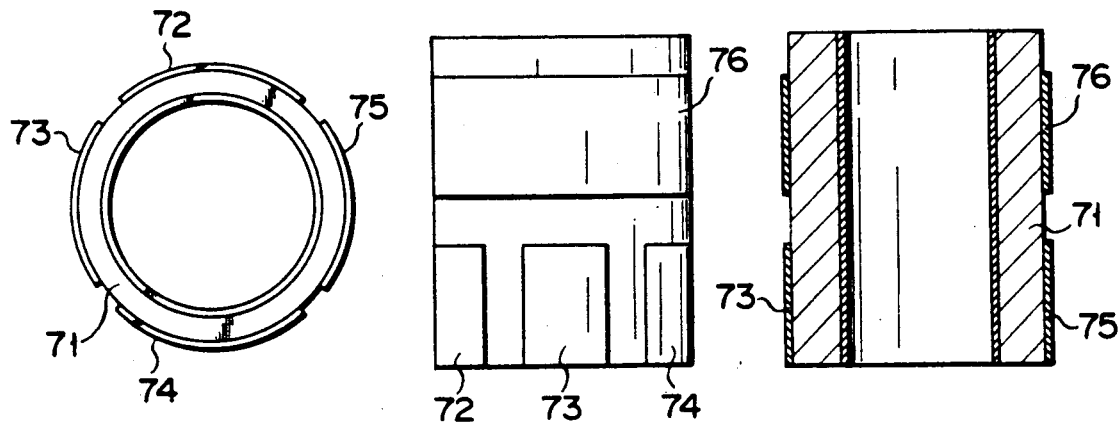

When voltage having such polarities as shown in FIG. 9 is applied to electrodes 72 to 76 of the three-dimensional actuator arranged as described above, probe unit 1 can scan the surface of sample S selectively in directions X, Y and Z.

Figure 10:
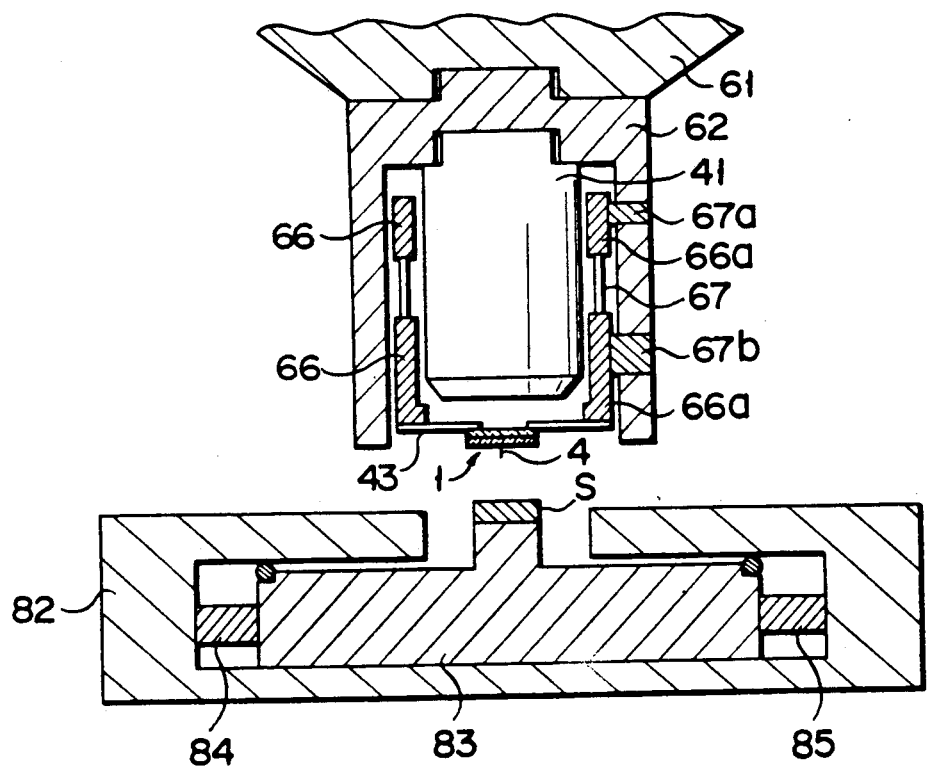

FIG. 10 shows a still further application of the probe unit. Actuator 43 shrinkable only in direction Z is used to move probe unit 1. Actuator 43 employed is a cylindrical bimorph cell provided with a circular opening in the center thereof. It is fixed, at its circumferential rim, to lower support 66a of inner frame 66. One of the above-described first to third probe units 1 is attached to its center opening. Probe unit 1 is arranged in such a way that the center axis of its projection 4 is aligned with the optical axis of objective lens 41. Frame-like support member 82 is located under objective lens unit 62, opposing to the latter. Support table 83 on which sample S is mounted is housed in support member 82. Actuators 84 and 85 are arranged between the side of support table 83 and the inner side of support member 82 to finely move support table 83 in directions X and Y.

According to this embodiment arranged as described above, actuators 84 and 85 are driven to move sample S in directions X and Y. At the same time, actuator 43 is also used to move probe unit 1 in direction Z. As the result, probe unit 1 can be moved in the three-dimensional directions to enable STM observation to be achieved relative to the surface of sample S, as seen in the above-described embodiment.

Figure 11:
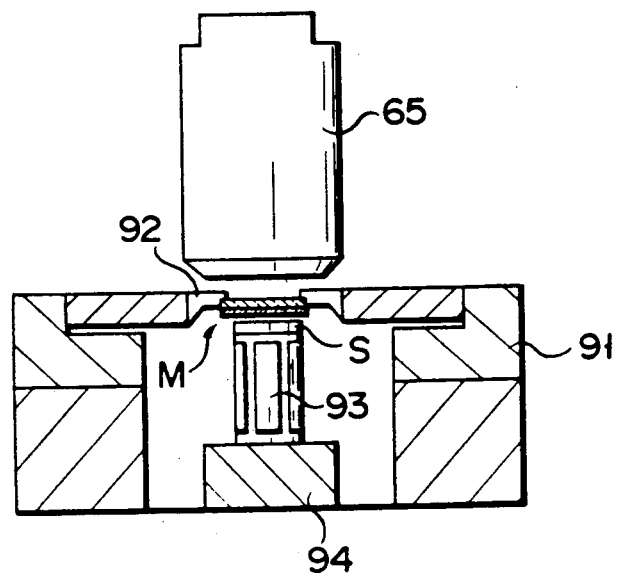

A still further application of the probe unit is shown in FIG. 11. The STM scanning system is located not on the side of the objective lens but on the side of the sample support system. Actuator 92 having an opening in the center thereof is attached to the top of frame-shaped support member 91. Probe unit 1 is attached to the opening of actuator 92. Actuator 93 on the top of which sample S is mounted is located under probe unit 1 and sample table 94 is arranged to hold actuator 93 on the top thereof.

According to this embodiment arranged as described above, actuator 93 moves sample S in direction Z to interpose a certain distance between sample S and probe unit 1. The above-mentioned three-dimensional actuator may be used instead of actuator 93.

The above embodiments are based on the STM operation. When the present invention is applied to an atomic probe microscope such as an AFM (Atomic Force Microscope), actuator 43 shown in FIG. 5 may be used to detect a displacement due to atomic force. As a result, it becomes unnecessarily to detect the tunnel current, and also transparent electrode 4 is not needed. Thus, in the embodiments shown in FIGS. 1A, 2C 3D, 5 and 6, the transparent electrodes can be dispensed with.

Figure 15:
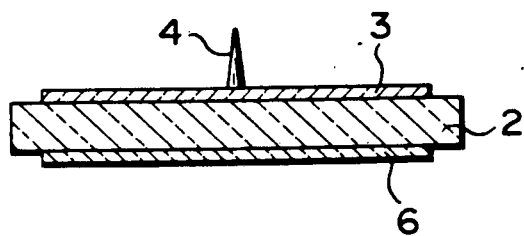

In FIG. 15, the present invention is applied to AFM observation. Transparent electrode 2 is formed of an optically transparent piezoelectric element such as $LiNb_2O_3$. An atomic force acting between transparent electrode film 6 and transparent electrode film 3 is detected by means of projection 4. In this case, the thickness of transparent electrode is fully reduced and the diameter of the disc is made large, thus forming a piezoelectric diaphragm. Transparent substrate 2 can be formed as a beam supported on both sides.

It should be understood that the present invention is not limited to the above-described embodiments and that various changes and modifications can be made without departing from the spirit and scope of the present invention.

According to the present invention, the probe unit is made optically transparent except its micro-projection and those portions of the substrate and electrode to which the projection is bonded. Therefore, the probe unit can be attached in front of the objective lens of the optical microscope or located between the sample and the objective lens. And when the projection of the probe unit is slightly shifted from the focusing position of the optical microscope, the STM observation can be conducted without hindering the field of view of the optical microscope.

What is claimed is:

1. A probe unit for a scanning tunnel microscope comprising a transparent substrate, a transparent electrode supported by the substrate, and a conductive projection supported by the substrate and electrically connected to the electrode, the conductive projection having a sharp front end projecting from the substrate.

2. The probe unit according to claim 1, wherein said conductive projection is a metal wire having a stem portion embedded in and supported by the substrate.

3. The probe unit according to claim 2, wherein said transparent electrode is a conductive layer formed on a surface of the substrate and the front of said metal wire passes through the conductive layer.

4. The probe unit according to claim 1, wherein said transparent electrode is a conductive layer formed on a surface of the substrate and said projection is formed on this conductive layer.

5. The probe unit according to claim 1, wherein said substrate has a disk shape and said projection is projected along the center axis of the substrate.

6. The probe unit according to claim 1, wherein said electrode has a layer vacuum-deposited on a surface of the substrate.

7. The probe unit according to claim 6, wherein said conductive projection has a conductive member selectively deposited on said vacuum-deposited layer.

8. The probe unit according to claim 1, wherein said substrate has a central protrusion on the top thereof and said projection is formed on the center of the protrusion.

9. A probe unit for a scanning tunnel microscope comprising a transparent substrate, a conductive probe vertically supported by the substrate, the probe having a sharp tip projecting from the substrate, and means for applying a voltage to said projecting tip.

10. The probe unit according to claim 9, wherein said probe includes a tip and base which are projected from the opposite surfaces of the substrate, and which includes a metal lead electrically connected to the base of the probe.

11. The probe unit according to claim 9, which includes a conductive pattern formed on the substrate and electrically connected to the probe.

12. The probe unit according to claim 9, which includes another transparent substrate and a transparent electrode formed between the transparent substrates.

13. The probe unit according to claim 9, which includes first and second transparent electrodes formed on the opposite surfaces of the substrate, said probe vertically projected from the first transparent electrode and electrically connected thereto.

14. A probe unit comprising a transparent substrate, a transparent electrode supported by the substrate, and a conductive projection supported by the substrate and electrically connected to the electrode, wherein said conductive projection is a metal wire having a stem portion embedded in and supported by the substrate and a sharp front projecting from the substrate.

15. The probe unit according to claim 14, wherein said transparent electrode is a conductive layer formed on a surface of the substrate, and the front of said metal wire passes through the conductive layer.

16. A probe unit comprising a transparent substrate, a transparent electrode supported by the substrate, and a conductive projection supported by the substrate and electrically connected to the electrode, wherein said substrate has a disk shape, and said projection projects along the center axis of the substrate.

17. A probe unit for an atomic probe microscope adapted to be positioned to face a sample, the probe unit comprising:

a transparent substrate, and conductive projection supported by the substrate, the conductive projection having a sharp front end projecting from the substrate, whereby at least a portion of the substrate around the projection passes light toward the sample and light from the sample.

* * * * *